United States Patent Office 3,268,498
Patented August 23, 1966

3,268,498
USE OF WAX DISPERSANTS IN THE RECOVERY OF α-OLEFIN POLYMERS FROM POLYMERIZATION REACTION PRODUCT
Donald E. Moore, Coleman, Aaron E. Prout, Rosebush, and Frederick A. Miller, Midland, Mich., assignors to The Dow Chemical Company, Midland, Mich., a corporation of Delaware
No Drawing. Filed Aug. 26, 1964, Ser. No. 392,294
5 Claims. (Cl. 260—88.2)

This invention relates to the recovery of α-olefin polymers from their polymerization mixtures in organic solvents.

The production of α-olefin polymers can advantageously be carried out by reacting a monomer or monomers and organometallic catalysts in the presence of a hydrocarbon solvent. Suitable catalyst systems include mixtures of a trialkyl aluminum compound and a compound of a heavier metal of the group IV–B, V–B or VI–B of the periodic system of the elements. A large number of alkyl aluminum compounds are operable including aluminum trimethyl, aluminum triethyl, aluminum tripropyl, aluminum triisobutyl, dialkyl aluminum halides and dialkyl aluminum hydrides. Salts of titanium, zirconium, vanadium, uranium, thorium and chromium are oftentimes preferred as the groups IV–B, V–B or VI–B metallic compounds in the catalyst systems, although salts of the remaining metals in these sub-groups may also be employed. Such polymers are well described in the literature. Polyolefin Resin Processes by Marshall Sittig, published in 1961 by the Gulf Publishing Company, Houston, Texas, gives a description of the composition and preparation of these types of polymers.

In the polymerization processes, inert organic liquids are often employed as reaction media. Suitable media include aliphatic, alcyclic or aromatic hydrocarbons with low to medium boiling ranges. Specific examples are propane, butane, pentane, hexane, heptane, cyclohexane, alkylated cyclohexane, benzene, toluene, kerosene and diesel oil.

The reaction products, being soluble in some of the polymerization solvents, sometimes form viscous final reaction mixtures from which the polymer can be precipitated by non-solvents such as alcohols, ketones and the like. However, the precipitated products are highly solvated, tend to agglomerate and tenaciously retain the solvent during drying. The usual method of separating the polymer from the solvent is by vacuum devolatilization. However, the elevated temperature necessary to effect the devolatilization causes degradation of the polymer. Thus, there is a need for an improved method of drying α-olefin polymers in which agglomeration of polymer particles is minimized.

An object of this invention is to provide an α-olefin polymer of improved quality.

A further object is to provide an improved method of recovery of α-olefin polymers from their polymerization mixtures in organic solvents.

A still further object is to provide an improved method of treating raw polymerization reaction product to separate the polymer from solvent and impurities.

Another object is to separate dry polymer products from a polymerization reaction product containing the same by a procedure involving non-aqueous treating agents.

An additional object is to separate dry polymer products from a polymerization reaction product containing the same by a process whereby the polymer particles undergo negligible agglomeration during the separation.

Various other objects, advantages and features of the invention will become apparent from the following detailed description.

The objects of this invention are attained in an improved process in which the product of polymerization of a monomer in an inert liquid diluent solvent in the presence of an organometal catalyst in known manner as set forth hereinbefore is withdrawn from the polymerization reaction zone and dispersed into a liquid monohydroxy organic compound containing a wax as an aid to dispersion. The resulting dispersion is passed to an extraction zone wherein the starting solvent reaction medium is displaced from the polymer and replaced by the monohydroxyl organic compound, e.g. by alternate decantation and addition of further portions of the monohydroxy compound or by continuous extraction techniques. The polymer particles are finally freed of the monohydroxy compound, e.g. by filtration and drying, to produce a dry polymer product in convenient non-agglomerated free-flowing particle form.

The steps of the improved process are shown schematically as follows:

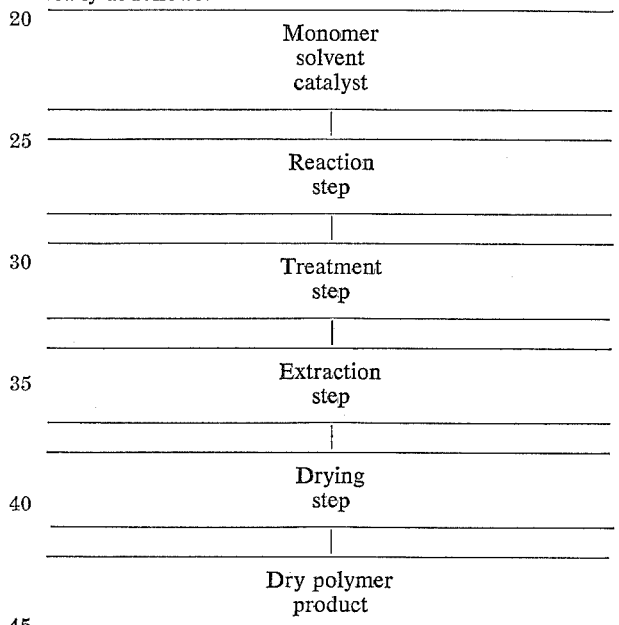

It has been discovered in accordance with this invention that the presence of a wax in the liquid monohydroxy organic compound in the treatment step advantageously results in the formation of discrete granules of polymer in the resulting dispersion and that such granules remain discrete and non-agglomerated during the subsequent extraction, filtration, drying and handling steps.

Waxes suitable for use as suspending agents including the vegetable waxes such as candelilla, carnauba, ouricury, palm and raffia, the animal and insect waxes such as beeswax, sperm oil, chinese insect and wool, both of which classes of waxes contain as their main constituents high molecular weight acids, alcohols, esters and saturated hydrocarbons with the esters predominating. In addition, petroleum waxes such as paraffin, microcrystalline, montan, ozocerite and ceresin; japan which is composed of a preponderance of glycerides; and synthetic waxes such as the esters of polyhydric alcohols, high molecular weight acids and alcohols, fatty acid amides, nitriles and amines and chlorinated hydrocarbons are also operable.

The organic monohydroxy compounds used as the dispersion medium and as the extractant are the glycol monoethers such as dipropylene glycol methyl ether, tripropylene glycol methyl ether, 2-ethoxyethanol, 2-isopropoxyethanol, 2-(2-ethoxyethoxy)ethanol, 1-methoxy-2-propanol and the like as well as the saturated aliphatic monohydroxy alcohols having from 1 to 10 carbon atoms such as methyl alcohol, ethyl alcohol, isopropanol, n-propanol, n-butanol and the like.

Example 1

A copolymer of ethylene and propylene was formed by reacting a mixture of ethylene and propylene monomers in the presence of a catalytic mixture of aluminum triethyl and titanium tetrachloride dispersed in xylene. The reaction product consisted of an 11 percent by weight copolymer solution in xylene. In a separate mixing vessel, 1.0 gram candelilla wax was added to 500 ml. ethyl alcohol. To the resulting mixture was added 500 grams of the 11 percent copolymer solution in xylene to form a smooth creamy suspension. Upon standing, the polymer tended to settle out of the suspension. 830 ml. of a solution of xylene in ethyl alcohol were decanted. A first aliquot portion of 500 ml. ethyl alcohol was added to the polymer residue which was still partially wet with the xylene solvent and the system again agitated to form a suspension. The suspension was allowed to settle. 520 ml. of the xylene-ethyl alcohol solution was decanted. This same procedure was repeated by successively adding four additional 500 ml. aliquot portions of ethyl alcohol to the polymer residue with the formation of a suspension, settling and decantation following each such addition. The amount of xylene solution in ethyl alcohol decanted after the second, third, fourth and fifth additions of ethyl alcohol were 590, 505, 490 and 500 ml. respectively. A sample of the polymer residue was filtered off and air dried following the fourth addition of ethyl alcohol and decantation. This polymer was found to contain 0.7 percent xylene. The remainder of the polymer residue was similarly filtered and dried after the fifth addition of ethyl alcohol and decantation. This polymer was found to be completely free of xylene and in the desired dry free-flowing particulate form suitable for further processing.

Example 2

In a manner like that described in Example 1 200 grams of the ethylene-propylene copolymer solution in xylene as prepared in Example 1 (containing 11 percent by weight of copolymer) was added with stirring to a solution of one gram of candelilla wax in 500 ml. of methyl alcohol. The precipitated copolymer particles were allowed to settle, then the supernatant liquid was decanted. The polymer particles were washed three times with 500 ml. portions of methyl alcohol by stirring, settling, and decanting, finally collecting and drying the polymer on a suction filter. The resulting dry copolymer product was a free-flowing granular material.

The concentration of wax dispersant in the suspension system should be at least 0.1 percent based on the weight of the polymer solids present in the suspension to effectively prevent agglomeration of polymer particles during the extraction step of the process. Concentrations of more than 1.0 percent dispersant may be used but are not generally employed because they unnecessarily add to the expense of the treatment without further improving the desired sparation.

The amount of organic monohydroxy compound required for the solids-liquid extraction depends on the concentration of polymer in the polymerization reaction product and the completeness with which it is desired to remove the solvent. Generally, the amount of the extractant should be from three to 10 times the volume of the polymerization reaction product. When using a batch extraction process it is advantageous to divide this extractant into from at least two to 10 or more portions with decantation following the use of each such portion.

While the foregoing description has been concerned mainly with the recovery of copolymers of ethylene and propylene from their polymerization reaction mixtures, it should be pointed out that the invention is not limited to such polymer products but is equally applicable to homopolymers and copolymers of ethylene, propylene, butylene and other $\alpha$-olefin compounds.

Example 3

Example 1 is repeated, with substantially the same results in recovering the polymer product in particulate, granular form, with the following variations.

The ethylene-propylene copolymer is replaced by various polymers and copolymers of ethylene, propylene, butylene and other $\alpha$-olefins.

The diluent-solvent for the polymer is replaced by a liquid aliphatic, alicylic, or aromatic hydrocarbon.

The candelilla wax is replaced by another vegetable wax, animal or insect wax, petroleum wax, and synthetic waxy materials.

The ethyl alcohol is replaced by isopropanol, n-propanol, n-butanol, n-hexanol, n-octanol, n-decanol (i.e. saturated monohydroxy alcohols having from 1 to 10 carbon atoms), dipropylene glycol methyl ether, tripropylene glycol methyl ether, 2-ethoxyethanol, 2-isopropoxyethanol, 2-(2-ethoxyethoxy)ethanol, 1-methoxy-2-propanol and like glycol monoethers.

This application is a continuation-in-part of our copending application, Serial Number 207,770, filed July 5, 1962, now abandoned.

What is claimed is:

1. In a process wherein an $\alpha$-olefin is polymerized in the presence of an organometal catalyst mixture and a liquid diluent solvent, the steps of recovering the particulate polymer from the resulting polymer reaction mixture by mixing therewith a liquid monohydroxy organic compound selected from the class consisting of glycol monoethers and saturated aliphatic monohydroxy alcohols having from 1 to 10 carbon atoms and a wax to form a suspension of the particulate polymer in a solution of the liquid diluent solvent and the liquid monohydroxy organic compound, displacing the liquid diluent solvent and catalyst residues from the suspension by adding additional quantities of the liquid monohydroxy organic compound to the suspension and withdrawing therefrom a mixture of the liquid diluent solvent, the liquid monohydroxy organic compound and the catalyst residues and separating the particulate $\alpha$-olefin polymer from the resulting suspension of said polymer in the liquid monohydroxy organic compound.

2. The process of claim 1 wherein the wax constituent is present in a concentration of between 0.1 percent and 1.0 percent based on the weight of the polymer.

3. The process of claim 1 wherein the wax constituent is candelilla wax.

4. The process of claim 1 wherein the organic monohydroxy compound is methyl alcohol.

5. The process of claim 1 wherein the organic monohydroxy compound is ethyl alcohol.

No references cited.

JOSEPH L. SCHOFER, *Primary Examiner.*

F. L. DENSON, *Assistant Examiner.*